(12) United States Patent
Van Den Berg et al.

(10) Patent No.: US 6,491,882 B1
(45) Date of Patent: Dec. 10, 2002

(54) HIGH-PRESSURE DEVICE

(75) Inventors: Robert Willem Van Den Berg, Rotterdam (NL); Paul Vincent Bartels, Wageningen (NL); Ludo Jean Maria Mathilde Van Schepdael, Herent (NL)

(73) Assignee: ATO B.V., Wageningen (NL)

( * ) Notice: Subject to any disclaimer, the term of this patent is extended or adjusted under 35 U.S.C. 154(b) by 0 days.

(21) Appl. No.: 09/701,199

(22) PCT Filed: May 27, 1999

(86) PCT No.: PCT/NL99/00329

§ 371 (c)(1),
(2), (4) Date: Nov. 27, 2000

(87) PCT Pub. No.: WO99/61146

PCT Pub. Date: Dec. 2, 1999

(30) Foreign Application Priority Data

May 27, 1998 (NL) .............................................. 1009267

(51) Int. Cl.[7] .............................. A61L 2/00; F04B 17/00; F01B 11/02; B65D 1/40
(52) U.S. Cl. ........................ 422/295; 422/297; 422/301; 417/403; 92/169.2; 92/171.1; 220/62.19; 220/589; 220/592
(58) Field of Search ............................ 422/33, 39, 243, 422/905, 292–293, 295–299, 300–309; 417/403; 92/169.2, 171.1; 220/62.19, 589, 592

(56) References Cited

U.S. PATENT DOCUMENTS 3,775,043 A    11/1973  Johansson et al. .......... 432/205
4,152,111 A     5/1979  Larker ......................... 432/205
5,288,462 A  *  2/1994  Carter et al.
5,631,029 A     5/1997  Bewlay et al. ................. 425/78

FOREIGN PATENT DOCUMENTS

| EP | 0117148 | 8/1984 | ............ F16J/12/00 |
| EP | 0842696 | 5/1998 | ............ B01J/3/04 |
| JP | 2114743 | 5/1993 | ............ B01J/3/04 |
| WO | WO 9521690 | 8/1995 | ............ B01J/3/04 |

OTHER PUBLICATIONS

International Search Report PCT/NL99/00329 Sep. 1999.

* cited by examiner

Primary Examiner—Robert J. Warden, Sr.
Assistant Examiner—Monzer R. Chorbaji
(74) Attorney, Agent, or Firm—Handal & Morofsky

(57) ABSTRACT

The invention relates to a high-pressure device (1) having a cylindrical high-pressure vessel (3) and prestressing means in order to exert an axial pressure on the vessel. The vessel (3) can have been formed from a number of layers of composite material, such as glass, carbon or aramid fibers which are oriented in the peripheral direction and are embedded in a matrix of epoxy resin or polyurethane. By applying the axial prestress to the pressure vessel (3), the tangential stress is distributed more uniformly over the wall thickness of the high-pressure vessel (3), the stress decreasing at the inside of the wall and increasing at the outside thereof. As a result, the innermost fibers of a high-pressure vessel (3) made of composite material are subjected to appreciably less stress, which has a beneficial effect on the life of the high-pressure vessel (3), and all fibers of the wall are utilized effectively. Preferably, the prestressing means comprise a pressure ring (14) which can be brought into engagement around the pressure-generating piston (9) with one end face of the high-pressure vessel (3).

23 Claims, 4 Drawing Sheets

HIGH-PRESSURE DEVICE

Figure 1:
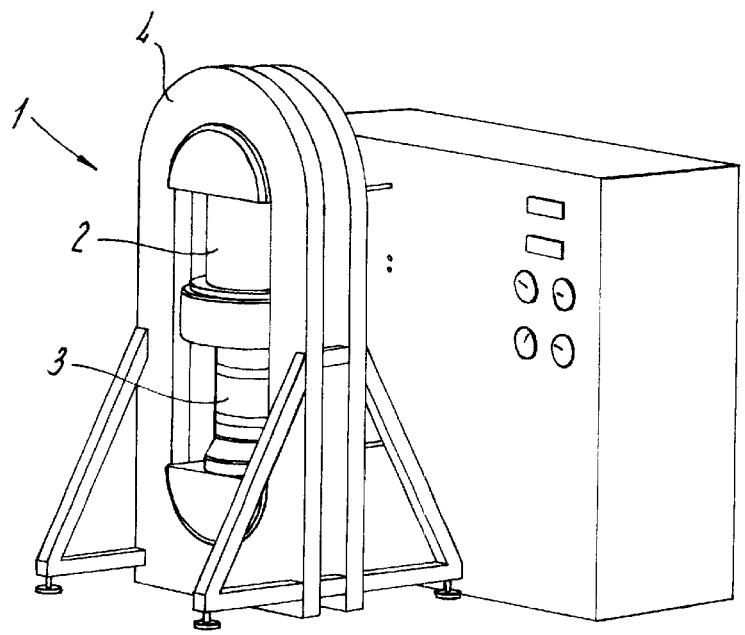

The invention relates to a high-pressure device comprising an essentially cylindrical high-pressure vessel and external prestressing means for exerting an external pressure on the vessel.

WO 95/21690 discloses a high-pressure vessel having a cylindrical liner which is open at two ends and has been placed under radial prestress with the aid of a steel wire winding. With said high-pressure vessel the prestressing as a consequence of the steel winding is equal to the tangential stress that is generated when the high-pressure vessel is pressurised.

Pressures of between 1,000 and 15,000 bar can be generated in the known high-pressure vessel. In this context the cylindrical pressure vessel can be filled with a fluid in order to exert an isostatic pressure on, for example, foodstuffs, pharmaceuticals, cosmetic preparations and the like. By means of the high-pressure treatment under these pressures harmful microorganisms and enzymes can be killed without vitamins being damaged or the taste impaired.

As a consequence of the varying stress on the known pressure vessel, hairline cracks can be formed therein, with the result that the vessel ultimately becomes unsuitable for use. In order to provide adequate resistance to the internal pressure and to prevent the formation of hairline cracks, the known pressure vessels are of relatively heavyweight construction with multiple concentric steel walls. The removal of the relatively heavyweight pressure vessel from the hydraulic press, emptying thereof and loading with new material to be treated takes a relatively long time, with the result that the throughput of the known device is limited. Making the high-pressure vessel according to the prior art of more lightweight construction in order to be able to fill and empty this more rapidly and more easily would, in turn, lead to the use of lower pressures, as a result of which the residence time of the product in the high-pressure vessel increases.

It is therefore an aim of the present invention to provide a high-pressure device with which the high-pressure vessel can be of relatively lightweight construction whilst it can nevertheless still be operated under high pressures. A further aim of the present invention is to provide a high-pressure device with which the residence time of the products can be shortened, with which the high-pressure vessel can relatively simply and easily be placed outside the high-pressure device and can be filled and emptied easily and with which a long life throughout a large number of pressure load cycles is possible.

To this end the high-pressure device according to the present invention is characterised in that the vessel is reinforced with fibres, the prestressing means comprising a compression device for exerting an axial pressure on the high-pressure vessel. It has been found that by applying axial prestressing to the high-pressure vessel by compression in the axial direction the stress pattern over the wall of the vessel is more uniform. As a result the stress on the innermost wall section is appreciably reduced, which has beneficial effect on the life of the vessel. Furthermore, the entire wall thickness is more usefully used to obtain the desired strength, with the result that the wall can be of thinner construction or, if the wall thickness remains the same, the pressure can be increased.

Preferably, the vessel is made of a composite material comprising fibres embedded in plastic. The pressure exerted by the prestressing means can be dependent on the internal pressure in the high-pressure vessel, so that no prestressing is exerted when the vessel is not pressurised. The prestressing means can comprise a pressure element which is movable in the axial direction with respect to the cylindrical high-pressure vessel and engages on an end face of the high-pressure vessel, as well as a feed line for feeding a hydraulic fluid to the pressure element. With a relatively small number of simple modifications, such prestressing means can easily be integrated in known hydraulic installations for generating pressure in the high-pressure vessel.

The high-pressure vessel according to the present invention can comprise metal and preferably comprises a composite material made from fibres having a tensile strength of 1,000 MPa or higher, such as for example, glass fibres, carbon fibres or aramide fibres. Said fibres can have been embedded in a matrix of, for example, an epoxy resin, a polyamide or polyurethane. Preferably, the fibres are oriented essentially in the peripheral direction, so that a high tangential strength of the high-pressure vessel is obtained. Suitable high-pressure vessels made of composite materials of the abovementioned type are described in detail in European Patent Application no. 96203187.8 in the name of the Applicant. A high-pressure vessel made of composite material to which axial prestressing is applied according to the invention has a life of 300,000 cycles or more for an operating pressure of 10 Kbar.

By applying axial prestressing, the shear stress in the wall of the high-pressure vessel, in particular in a wall made of composite material, is lowered.

One embodiment of a high-pressure device according to the present invention is characterised in that the high-pressure vessel is provided close to at least one of the end faces with a reinforcing ring that thickens radially towards the outside in the axial direction. To bring the prestress in the wall as a function of the distance from the axis of the vessel to the correct value, the pressure ring is shaped such that the shear stress is reduced close to the interior of the high-pressure vessel and is increased for wall sections close to the outside of the wall. Furthermore, as a result of the use of the reinforcing ring the radial stretch close to the end faces (at the location of a possible seal) is minimised.

An advantageous embodiment of a high-pressure device according to the invention comprises a housing having a longitudinal axis and a first and a second pressure chamber located along said axis. A top end face of the high-pressure vessel is located in or close to the second pressure chamber. A piston, having a piston head located in the first pressure chamber and a piston rod connected to said piston head, is movable in the longitudinal direction via the second pressure chamber as far as into the high-pressure vessel. A pressure ring is movably accommodated around the piston rod, which pressure ring is able to engage on the top end face of the high-pressure vessel. Feeding a hydraulic fluid to the second pressure chamber causes the pressure ring to bear on the wall of the cylindrical high-pressure vessel so as to apply the axial prestressing thereto. Preferably, the fluid pressure in the second pressure chamber is dependent on the fluid pressure which is exerted on the piston, so that the prestressing is proportional to the pressure on the piston and thus to the pressure in the interior of the high-pressure vessel.

The wall of the high-pressure vessel can have been built up from several layers, for example six layers, of high-tensile fibres, the liner of the vessel being made of a superelastic material. The superelastic material separates the composite jacket from the hydraulic medium and does not itself have to cope with any stresses. The liner must be able to withstand stretching of the order of magnitude of 2%. Nickel-titanium alloys or polymers such as ABS, PE, PP or polycarbonates are suitable for this purpose.

Figure 2:
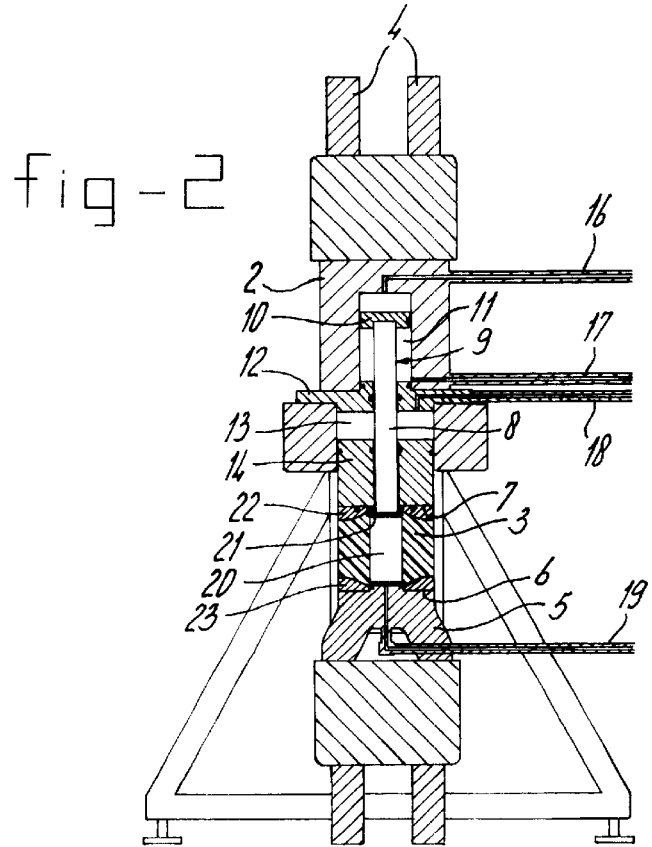
Figure 3:
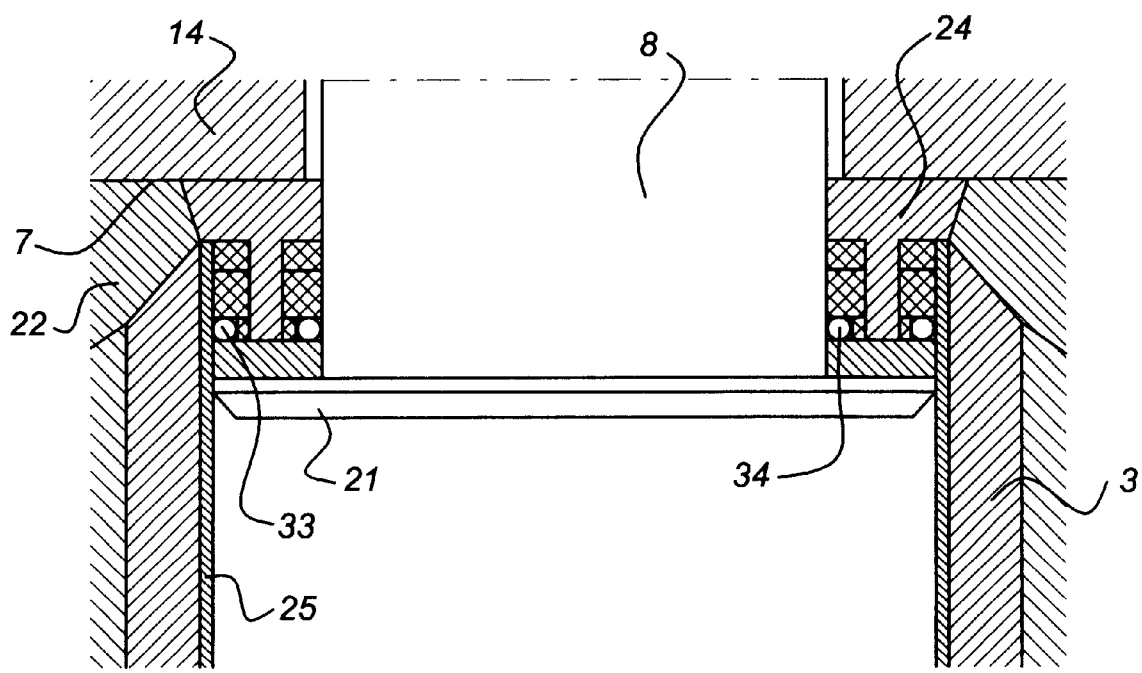
Figure 4:
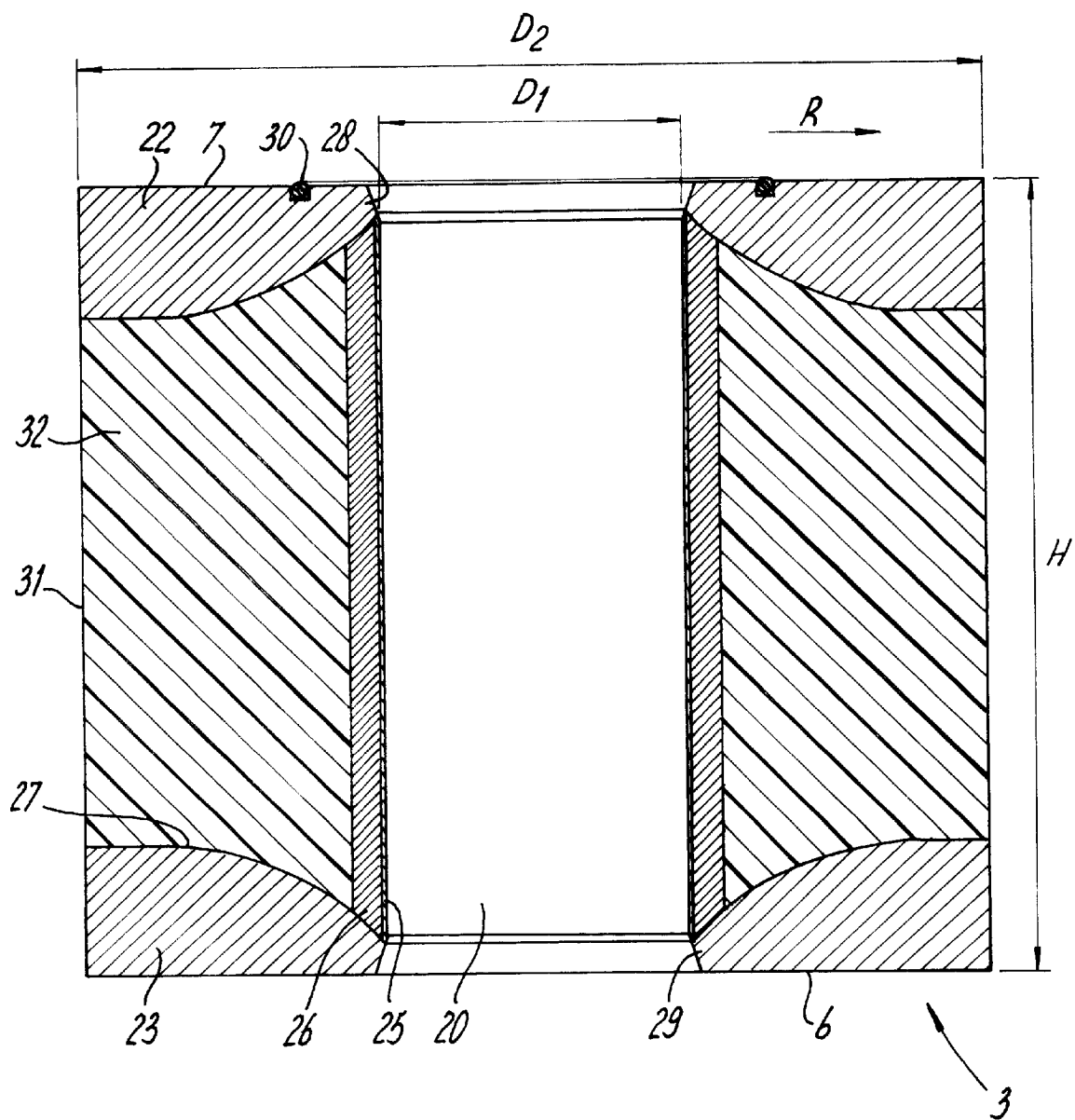

One embodiment of a high-pressure device according to the present invention will be explained in more detail by way of example with reference to the appended drawing. In the drawing:

FIG. 1 shows a perspective view of a high-pressure device according to the present invention, FIG. 2 shows a longitudinal section through the device according to FIG. 1, FIG. 3 shows, on an enlarged scale, a detail of the end of the piston rod, FIG. 4 shows a longitudinal section through a high-pressure vessel suitable for use in the device according to FIGS. 1 and 2, and FIGS. 5a and 5b show the plot of the tangential stress in the wall of the high-pressure vessel made of composite material, without and with axial prestressing, respectively.

FIG. 1 shows a high-pressure device 1 according to the present invention, comprising a housing 2 with a piston and a pressure ring movable to and fro therein. Prestressing means for exerting an axial pressure on the wall of a high-pressure vessel 3 are also accommodated in said housing 2. The cylindrical high-pressure vessel 3 abuts the housing 2 and, via, for example, a rail system, which is not shown in the figure, can be placed under the housing 2 and removed again from the side. The device 1 further comprises a yoke 4, made up of a number of parallel reinforcing plates, to hold the high-pressure vessel 3 and the housing 2 together in the axial direction during operation under operating pressures of 10,000 bar and higher. As is shown in FIG. 2, the high-pressure vessel 3 comprises a cylinder which is open at both ends and by means of a bottom end face 6 bears on a foot piece 5 of the pressure device 1. A piston rod 8 of a piston or "intensifier" 9 passes through the opening in the top end face 7 of the high-pressure vessel 3. The top of the piston 9 comprises a piston head 10 that is accommodated in a first pressure chamber 11 of the housing 2. The first pressure chamber 11 is closed off at the bottom by a wall 12 through which the piston rod 8 is fed with sealing. The wall 12 delimits a second pressure chamber 13, with a pressure ring 14 slidable to and fro therein.

On either side of the piston head 10, feed lines 16, 17 open into the pressure chamber 11 for moving the piston 9 to and fro. A feed line 18 opens into the second pressure chamber 13, between the pressure ring 14 and the wall 12. A fourth feed line 19 opens via the bottom end face 6 into the pressure chamber 20 of the high-pressure vessel 3.

A hydraulic medium, such as, for example, water, can be fed via the feed line 19 to the pressure chamber 20 to exert an isostatic pressure on the product to be treated, that has been placed in the pressure chamber 20. By means of the hydraulic medium 19, a pre-pressure of, for example, 2,000 bar can be generated. An operating pressure can then be applied to the piston head 10 by connecting the feed line 16 to the top section of the first pressure chamber 11. Said pressure will be transmitted proportionally to the ratio between the surface area of the piston head 10 and the surface area of the piston rod 8 to the pressure chamber 20 of the high-pressure vessel 3, so that the total internal pressure in this location is, for example, 10 kbar or higher. By connecting the feed line 18 to a pressure source, the second pressure chamber 13 is pressurised, so that the pressure ring 14 applies an axial prestress to the wall of the high-pressure vessel 3. At the end of a predetermined treatment time the pressure in the line 16 can be reduced so that the piston 9 is pushed upwards.

As is shown in more detail in FIG. 3, the end of the piston 9 is provided with a collar 21 which engages on a ring 24 provided with two seals. Said ring 24 engages on a bottom edge of the pressure ring 14. When the pressure in the second pressure chamber 13 is reduced, the pressure ring 14 is lifted free of the top end face 7 of the high-pressure vessel 3 by the collar 21 and ring 24. The high-pressure vessel 3 can then be removed from the high-pressure device 1 from the side.

Ring 24 is characterised by the presence of two seals 33 and 34. The outer seal 33 is a static high-pressure seal between the liner 25 and the ring 24. The inner seal 34 is a dynamic high-pressure seal between the piston rod 8 and ring 24.

Splitting up the seal offers at least three advantages. Firstly, the seal 33 can be constructed such that no extrusion of the liner 25 can occur. Secondly, there is no frictional contact between the seal 33 and the liner 25. Finally, if there were to be a dynamic seal on the liner, the seal would have to seal a gap of a few millimeters because of the high elastic stretch of the composite. As a result of splitting the seal, the radial expansion that has to be filled by the set of seals is minimal.

Steel reinforcing rings 22, 23 are fitted to the top and bottom end faces 7, 6 in order to ensure correct distribution of the tangential prestress generated by the pressure ring 14 on the walls of the vessel 3. The thickness of said reinforcing rings decreases in the direction of the axis of the high-pressure vessel 3. The radial stretch at the top and bottom of the pressure vessel 3 is also minimised by means of these rings.

FIG. 4 shows the high-pressure vessel 3 according to the present invention on an enlarged scale. The high-pressure vessel 3 comprises an open cylinder, the liner 25 of the pressure chamber 20 being made of a superelastic material. Said liner 25 does not have to cope with any stresses and is not replaced during the life of the high-pressure vessel 3. The liner 25 is able to withstand stretching of the order of magnitude of 2%. The liner 25 can be made of superelastic materials such as nickel-titanium alloys. Polymers such as APS, PE, PP or polycarbonates can also be used. A layer of composite material 26 having, for example, fibres located in the peripheral direction which have breaking stresses of the order of magnitude of 1,000–10,000 MPa, such as glass fibres, carbon fibres or aramide fibres, is located around the liner 25. Said fibres can have been embedded in, for example, an epoxy resin or in polyurethanes. The wall 32 of the high-pressure vessel 3 can have been formed from various layers of composite material as described in European Patent Application no. 96203187.8.

At the top and bottom of the high-pressure vessel 3 the reinforcing rings 22, 23 are provided with a chamfered edge 28, 29, against which the sealing ring 24 is able to bear, which ring is in sliding contact around the piston rod 8 at the top of the high-pressure vessel 3, as shown in FIG. 3, and forms part of the foot piece 5 at the bottom of the high-pressure vessel 3. As a result of the use of the pressure ring 14, which during operation is in contact with the top end face 7, an axial seal 30 can be used in order to achieve a good seal over the end face 7, even under the very high operating pressures.

The height H of the high-pressure vessel 3 can be, for example, 27 cm. External diameter D2 of the high-pressure vessel 3 is, for example, 30 cm, whilst the diameter D1 of the pressure chamber 20 is 10 cm. The thickness of the reinforcing rings 22, 23 is, for example, 4.5 cm at the outer periphery 31 of the high-pressure vessel 3. The abovementioned dimensions are illustrative only and can be varied within a wide range, depending on the size and quantity of the material to be treated in the pressure chamber 20.

Figure 5A:
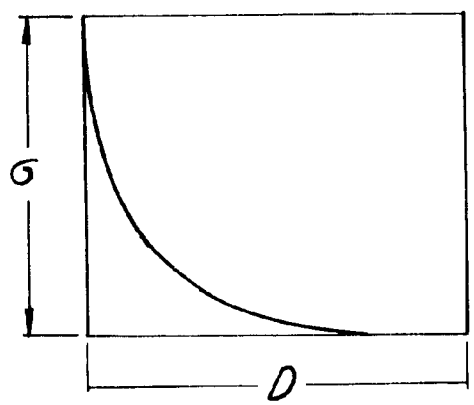
Figure 5B:
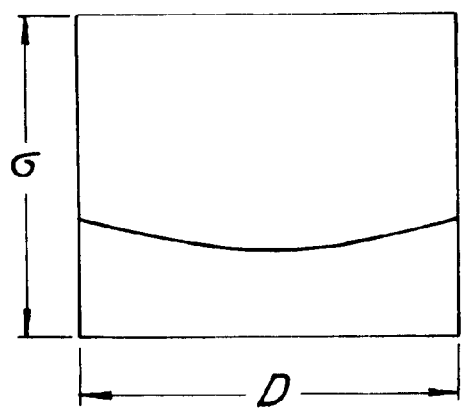

FIG. 5a shows a plot of the tangential stress over the width, D, of the wall 32 of the high-pressure vessel 3, on applying a pressure in pressure chamber 20, without an axially directed prestress being exerted on the wall. The tangential stress σ is highest at the location of the liner 25 and decreases very rapidly towards the outer periphery 31 of the wall 32. As can be seen from FIG. 5b, as a result of applying an axial prestress to the wall 32 via the reinforcing rings 22, 23, the tangential stress at the location of the liner 25 (on the left in FIG. 5b) is appreciably reduced and the tangential stress at the location of the outer periphery 31 (on the right in FIG. 5b) is increased, so that a more uniform stress pattern is obtained. Lowering of the tangential stress appreciably reduces the load on the fibres of the composite material close to the liner 25 and has a beneficial effect on the life of the pressure vessel 3. The fibres are also usefully used over the entire thickness of the wall 32 and it is not only the innermost fibres which are effective. Preferably, the prestressing on the pressure vessel 31 is such that an axial compression of 0.5% to 2% is obtained.

Preferably, the pressure vessel 3 according to the present invention is provided with an acoustic emission device for detecting microdefects which develop during pressurising the pressure vessel and reducing the pressure. If the pressure vessel is nearing its critical life, the intensity of the number of microdefects will increase sharply but the vessel will still appear to be completely intact from the outside. By measuring the acoustic emission, the safety of the high-pressure vessel 3 can be guaranteed and a high-pressure process can be terminated in time if the number of microdefects exceeds a critical upper limit.

What is claimed is:

1. A high-pressure apparatus for subjecting products to pressure treatment the apparatus comprising:
    a) a high-pressure vessel to contain the products to be treated, the high pressure vessel having an axis and being capable of being axially pressurized;
    c) a first pressure source to apply internal pressure to the high-pressure vessel;
    d) a compression device movable axially to exert an external pressure on the vessel to axially prestress the vessel; and
    e) a second pressure source to effect said axial movement of the compression device.

2. A high-pressure apparatus according to claim 1 wherein the high-pressure vessel is annular, optionally cylindrical, and the first pressure source comprises an axially movable piston received in the high-pressure vessel.

3. A high-pressure apparatus according to claim 2 wherein the high-pressure vessel is fiber-reinforced and optionally is made of a composite material comprising fibres embedded in plastic, wherein the external pressure exerted by the compression device depends upon the internal pressure in the high-pressure vessel and wherein the compression device comprises a pressure element, optionally a ring, moveable in the axial direction to engage one of the end faces of the high-pressure vessel and a feed line for supplying a hydraulic fluid to the pressure element.

4. A high-pressure apparatus according to claim 1 wherein the high-pressure vessel is fiber-reinforced and optionally is made of a composite material comprising fibres embedded in plastic.

5. A high-pressure apparatus according to claim 1 wherein the external pressure exerted by the compression device depends upon the internal pressure in the high-pressure vessel.

6. A high-pressure apparatus according to claim 1 wherein the compression device comprises a pressure element, optionally a ring, moveable in the axial direction to engage one of the end faces of the high-pressure vessel and a feed line for supplying a hydraulic fluid to the pressure element.

7. A high-pressure apparatus according to claim 1 wherein the high-pressure vessel comprises fibres oriented peripherally to and transversely of the vessel axis.

8. A high-pressure apparatus according to claim 1 wherein the high-pressure vessel comprises a peripheral wall having opposed end faces and the high-pressure apparatus comprises a reinforcing ring adjacent at least one of the circumferential wall end faces, the reinforcing ring thickening radially outwardly of the high-pressure vessel axis, provided close to at least one of the end faces with a reinforcing ring that thickens radially towards the outside in the axial direction.

9. A high-pressure apparatus according to claim 1 wherein the reinforcing ring is a metal ring.

10. A high-pressure apparatus according to claim 1 comprising
    c) a housing disposed on the vessel axis;
    d) first and second pressure chambers located along the longitudinal axis, one of said high-pressure vessel end faces being located in or close to the second pressure chamber; and
    e) a piston movable along the high-pressure vessel axis and comprising:
        i) a piston head located in the first pressure chamber; and
        ii) a piston rod connected to the piston head and extending through the second pressure chamber to the high-pressure vessel; and
    f) a pressure ring in the second pressure chamber extending around the piston rod and axially movable to engage one of the end faces of the high-pressure vessel.

11. A high-pressure apparatus according to claim 10 comprising two hydraulic fluid feed lines supplying the first pressure chamber, one feed line being located on either side of the piston head.

12. A high-pressure apparatus according to claim 10 comprising a feed line communicating with the second pressure chamber at a location remote from the high-pressure vessel for feeding a hydraulic fluid to the pressure ring.

13. A high-pressure apparatus according to claim 1 wherein the compression device comprises a pressure ring and the high-pressure apparatus comprises a collar engaging the underside of the pressure ring and a sealing ring located between the collar and the pressure ring.

14. A high-pressure apparatus according to claim 1 wherein the high-pressure vessel is provided with a hydraulic fluid feed line located remotely from the compression device.

15. A high-pressure apparatus according to claim 1 wherein the high-pressure vessel comprises a liner made of superelastic material.

16. A high-pressure apparatus according to claim 1 wherein the compression device can exert a prestress such that the high-pressure vessel is axially compressed from 0.5% to 2%.

17. A high-pressure apparatus according to claim 1 wherein the pressure in the high-pressure vessel is higher than 5,000 bar, optionally higher than 10,000 bar.

18. A high-pressure apparatus according to claim 1 comprising a housing on the high-pressure vessel axis, the housing accommodating the first pressure source.

19. A high-pressure apparatus according to claim 18 comprising a yoke extending around the housing and the high-pressure vessel to hold the housing and the first pressure vessel axially together when the high-pressure vessel is pressurized.

20. A high-pressure apparatus according to claim 18 wherein the first pressure source comprises a first hydraulic feed line and a first pressure chamber and the second pressure source comprises a second hydraulic feed line and a second pressure chamber.

21. A high-pressure apparatus comprising:
 a) a cylindrical high-pressure vessel reinforced with fibers and having a longitudinal axis and a circumferential wall, the circumferential wall having opposed end faces;
 b) an external compression device for exerting an external axial pressure on the high-pressure vessel; and
 c) a reinforcing ring adjacent at least one of the circumferential wall end faces, the reinforcing ring thickening radially outwardly of the high-pressure vessel axis.

22. A high-pressure apparatus according to claim 21 wherein the compression device comprises a pressure ring, the reinforcing ring is metal and the high-pressure apparatus comprises a collar engaging the underside of the pressure ring and a sealing ring located between the collar and the pressure ring.

23. A high-pressure apparatus comprising:
 a) a cylindrical high-pressure vessel reinforced with fibers and having a longitudinal axis and a circumferential wall, the circumferential wall having opposed end faces;
 b) an external compression device for exerting an external axial pressure on the high-pressure vessel;
 c) a housing disposed on the vessel axis,
 d) first and second pressure chambers located along the longitudinal axis, one of said high-pressure vessel end faces being located in or close to the second pressure chamber, and
 e) a piston movable along the high-pressure vessel axis and comprising:
  i) a piston head located in the first pressure chamber; and
  ii) a piston rod connected to the piston head and extending through the second pressure chamber to the high-pressure vessel; and
 f) a pressure ring in the second pressure chamber extending around the piston rod and axially movable to engage one of the end faces of the high-pressure vessel.

* * * * *